(12) United States Patent
Ito et al.

(10) Patent No.: US 6,633,343 B2
(45) Date of Patent: Oct. 14, 2003

(54) DYNAMIC GAMMA CORRECTION APPARATUS

(75) Inventors: Keiichi Ito, Osaka (JP); Atsuhisa Kageyama, Osaka (JP); Nobutaka Okada, Osaka (JP); Katsuya Ishikawa, Osaka (JP); Hidetoshi Suzuki, Osaka (JP); Hisao Kunitani, Kyoto (JP); Yuki Kakuya, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 379 days.

(21) Appl. No.: 09/803,660

(22) Filed: Mar. 12, 2001

(65) Prior Publication Data

US 2002/0036716 A1 Mar. 28, 2002

(30) Foreign Application Priority Data

Mar. 14, 2000 (JP) .......................... 2000-070364

(51) Int. Cl.⁷ .......................... H04N 5/202; H04N 5/14; G03F 3/08
(52) U.S. Cl. .......................... 348/674; 348/673; 348/671; 348/675; 348/677; 348/678; 348/679; 358/518; 358/519; 358/455
(58) Field of Search .......................... 348/674, 675, 348/671, 673, 254, 255, 677–79; 358/519, 455, 518; 345/600

(56) References Cited

U.S. PATENT DOCUMENTS

| | | | | |
|---|---|---|---|---|
| 4,686,562 A | * | 8/1987 | Yamanaka | 348/677 |
| 5,089,890 A | * | 2/1992 | Takayama | 348/674 |
| 5,408,267 A | * | 4/1995 | Main | 348/254 |
| 5,461,430 A | * | 10/1995 | Hagerman | 348/674 |
| 5,671,023 A | * | 9/1997 | Nishiwaki et al. | 348/675 |
| 5,710,594 A | * | 1/1998 | Kim | 348/254 |
| 5,818,521 A | * | 10/1998 | Hieda | 348/222 |
| 6,020,921 A | * | 2/2000 | Aleksic et al. | 348/254 |
| 6,100,938 A | * | 8/2000 | Ha et al. | 348/674 |
| 6,215,529 B1 | * | 4/2001 | Sugimoto et al. | 348/675 |
| 6,304,300 B1 | * | 10/2001 | Warren et al. | 348/674 |
| 6,344,857 B1 | * | 2/2002 | Matono et al. | 345/600 |
| 6,570,611 B1 | * | 5/2003 | Satou et al. | 348/189 |

FOREIGN PATENT DOCUMENTS

| | | |
|---|---|---|
| JP | 4-37263 | 2/1992 |
| JP | 2000-278556 | 10/2000 |

* cited by examiner

*Primary Examiner*—John Miller
*Assistant Examiner*—Paulos M. Natnael
(74) *Attorney, Agent, or Firm*—McDermott, Will & Emery

(57) ABSTRACT

An appropriate correction quantity is obtained for a video luminance signal on an individual video basis with a characteristic value, like the maximum or average value, of the luminance signal taken into account, thereby performing gray scale correction more effectively. A dynamic gamma correction apparatus for performing a correction on a video luminance signal includes: a correction start point control section for obtaining a correction start point, which is a lower limit of a given correction range, in accordance with a characteristic value of the luminance signal; a gamma correction quantity calculating section for obtaining a provisional correction quantity for the luminance signal to be corrected using the correction start point and the luminance signal; a gamma correction gain control section for obtaining a gain for the provisional correction quantity in accordance with the characteristic value of the luminance signal; a multiplier for obtaining a product of the provisional correction quantity and the gain as a gamma correction quantity; and an adder for obtaining a sum of the luminance signal and the gamma correction quantity and outputting the sum. The correction start point and the gain for the provisional correction quantity are controllable in accordance with the characteristic value of the luminance signal. Thus, an appropriate gamma correction quantity can be obtained as a final correction quantity.

10 Claims, 13 Drawing Sheets

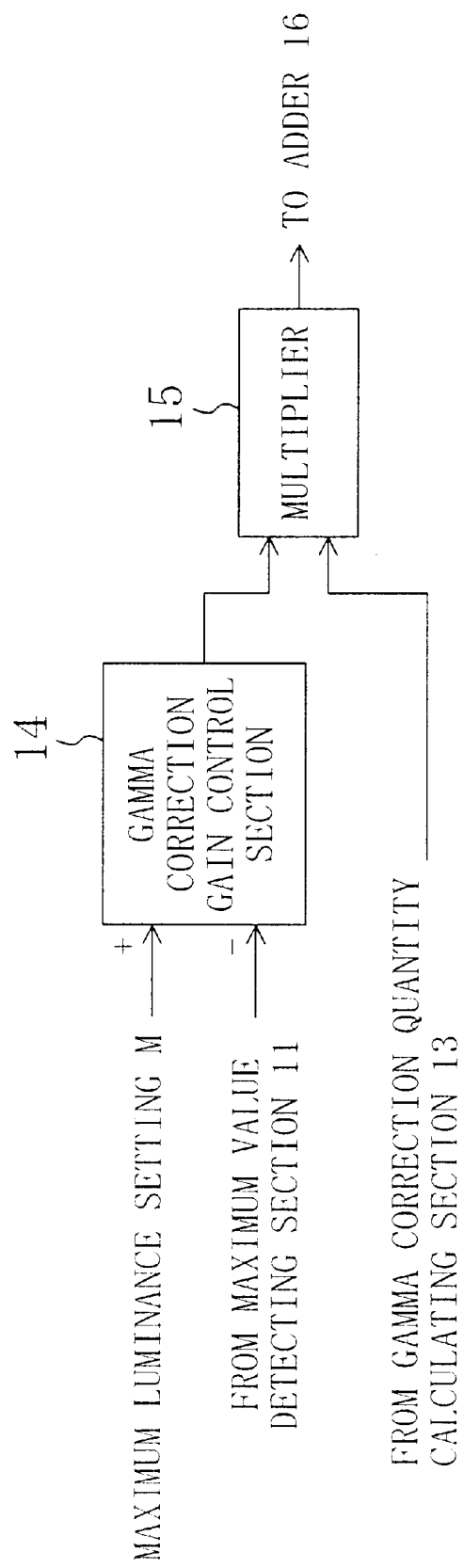

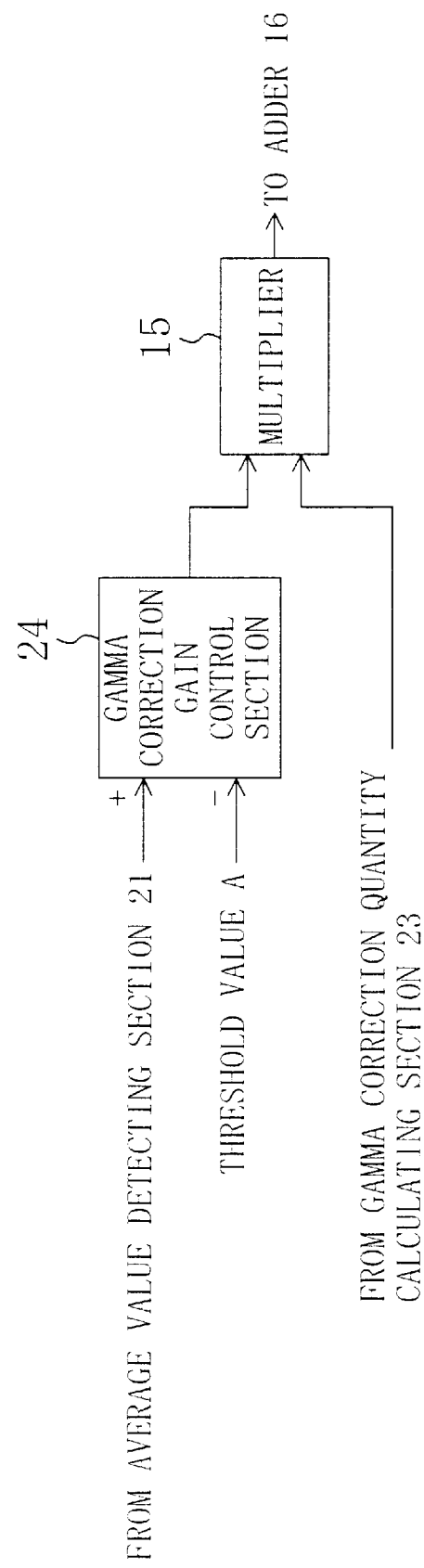

DYNAMIC GAMMA CORRECTION APPARATUS

BACKGROUND OF THE INVENTION

The present invention relates to an appliance for use in video processing and more particularly relates to a technique of correcting the gray scale of a video luminance signal in an appliance for presenting a video.

A gray scale correction called "gamma correction" has normally been carried out on a video luminance signal. This is a correction performed on a luminance signal using a gamma correction curve in accordance with the signal level thereof. The gamma correction is performed if the level of a luminance signal is equal to or greater than a predetermined value, which is referred to as a "correction start point". As is often the case with the prior art, the same correction start point is used for any luminance signal. Also, even if the correction start point is changed according to the average of a luminance signal, for example, the correction quantity is obtained only from the difference between the value of the luminance signal and the correction start point.

However, the characteristic value (e.g., maximum or average value) of a video luminance signal is greatly changeable from frame to frame. Accordingly, the correction quantity should be changed on a frame-by-frame basis even if a luminance signal with the same value is to be processed. For that reason, the gray scale correction could not be performed appropriately because the correction quantity has been obtained by using the same correction start point for any luminance signal or only the difference between the value of a luminance signal at an instant and the correction start point.

SUMMARY OF THE INVENTION

An object of this invention is providing a dynamic gamma correction apparatus for performing gray scale correction more effectively by obtaining an appropriate correction quantity for a specific type of video represented by a luminance signal with the characteristic (e.g., maximum or average value) of the video luminance signal taken into account.

Specifically, the present invention provides a dynamic gamma correction apparatus for performing a correction on a video luminance signal. The apparatus includes: a correction start point control section for obtaining a correction start point, which is a lower limit of a given correction range, in accordance with a characteristic value of the luminance signal; a gamma correction quantity calculating section for obtaining a provisional correction quantity for the luminance signal to be corrected using the correction start point and the luminance signal; a gamma correction gain control section for obtaining a gain for the provisional correction quantity in accordance with the characteristic value of the luminance signal; a multiplier for obtaining a product of the provisional correction quantity and the gain as a gamma correction quantity; and an adder for obtaining a sum of the luminance signal and the gamma correction quantity and outputting the sum.

According to the present invention, correction start point and gain with respect to provisional correction quantity are controllable in accordance with the characteristic value of a luminance signal. Thus, the gamma correction quantity, which is the final correction quantity, can be appropriate.

As used herein, the "characteristic value" of a luminance signal refers to the maximum, average, minimum value or the like in a predetermined number of fields or frames of the luminance signal or to a value obtained from these values.

The inventive dynamic gamma correction apparatus may further include a maximum value detecting section for obtaining a maximum value of the luminance signal. And the correction start point control section preferably obtains the correction start point in accordance with the maximum value. In such an embodiment, a luminance range, in which the gamma correction is performed, is controllable in accordance with the maximum value of the luminance signal.

Alternatively, the inventive dynamic gamma correction apparatus may further include an average value detecting section for obtaining an average value of the luminance signal. And the correction start point control section preferably obtains the correction start point in accordance with the average value. In such an embodiment, a luminance range, in which the gamma correction is performed, is controllable in accordance with the average value of the luminance signal.

As another alternative, the inventive dynamic gamma correction apparatus may further include: a maximum value detecting section for obtaining a maximum value of the luminance signal; and an average value detecting section for obtaining an average value of the luminance signal. And the correction start point control section preferably obtains the correction start point in accordance with a difference obtained by subtracting the average value from the maximum value. In such an embodiment, a luminance range, in which the gamma correction is performed, is controllable in accordance with the maximum and average values of the luminance signal.

As still another alternative, the inventive dynamic gamma correction apparatus may further include a minimum value detecting section for obtaining a minimum value of the luminance signal. And the correction start point control section preferably obtains the correction start point in accordance with the minimum value. In such an embodiment, a luminance range, in which the gamma correction is performed, is controllable in accordance with the minimum value of the luminance signal.

As yet another alternative, the inventive dynamic gamma correction apparatus may further include a maximum value detecting section for obtaining a maximum value of the luminance signal. And the gamma correction gain control section preferably obtains the gain in accordance with a value obtained by subtracting the maximum value from a preset maximum luminance. In such an embodiment, the gain with respect to the provisional correction quantity obtained by the gamma correction quantity calculating section is controllable in accordance with the maximum value of the luminance signal.

As yet another alternative, the inventive dynamic gamma correction apparatus may further include an average value detecting section for obtaining an average value of the luminance signal. And the gamma correction gain control section preferably obtains the gain in accordance with a value obtained by subtracting a preset threshold value from the average value. In such an embodiment, the gain with respect to the provisional correction quantity obtained by the gamma correction quantity calculating section is controllable in accordance with the average value of the luminance signal.

As yet another alternative, the inventive dynamic gamma correction apparatus may further include: a maximum value detecting section for obtaining a maximum value of the luminance signal; and an average value detecting section for obtaining an average value of the luminance signal. And the gamma correction gain control section preferably obtains the gain in accordance with the average and maximum values so that the higher the average value, the smaller the gain and that the lower the average value, the larger the gain. In such an embodiment, the gain with respect to the provisional correction quantity obtained by the gamma correction quantity calculating section is controllable in accordance with the average and maximum values of the luminance signal. In particular, since the gain is increased if the average value of the luminance signal is low, the gamma correction can be much more effective.

In the inventive dynamic gamma correction apparatus, the gamma correction quantity calculating section may obtain the provisional correction quantity by a linear function using the luminance signal to be corrected as a variable. And the linear function preferably has a predetermined number of intervals where the greater a variable associated with one of the intervals, the greater a coefficient of the linear function associated with the interval. In such an embodiment, a linear function is used and the provisional correction quantity can be obtained easily. Also, the higher the luminance is, the greater the provisional correction quantity can be.

The inventive dynamic gamma correction apparatus may further include a maximum value detecting section for obtaining a maximum value of the luminance signal. And the gamma correction quantity calculating section preferably determines the respective intervals of the linear function by the correction start point and the maximum value. In such an embodiment, an appropriate provisional correction value can be obtained for the luminance signal with a luminance between the correction start point and its maximum value.

BRIEF DESCRIPTION OF THE DRAWINGS

FIG. 3 is a block diagram illustrating part of the dynamic gamma correction apparatus shown in FIG. 1, in which the gain for gamma correction is controlled.

FIG. 9 is a block diagram illustrating part of the dynamic gamma correction apparatus shown in FIG. 8, in which the gain for gamma correction is controlled.

DETAILED DESCRIPTION OF THE INVENTION

Hereinafter, embodiments of the present invention will be described with reference to the accompanying drawings.
(First Embodiment)

Figure 1:
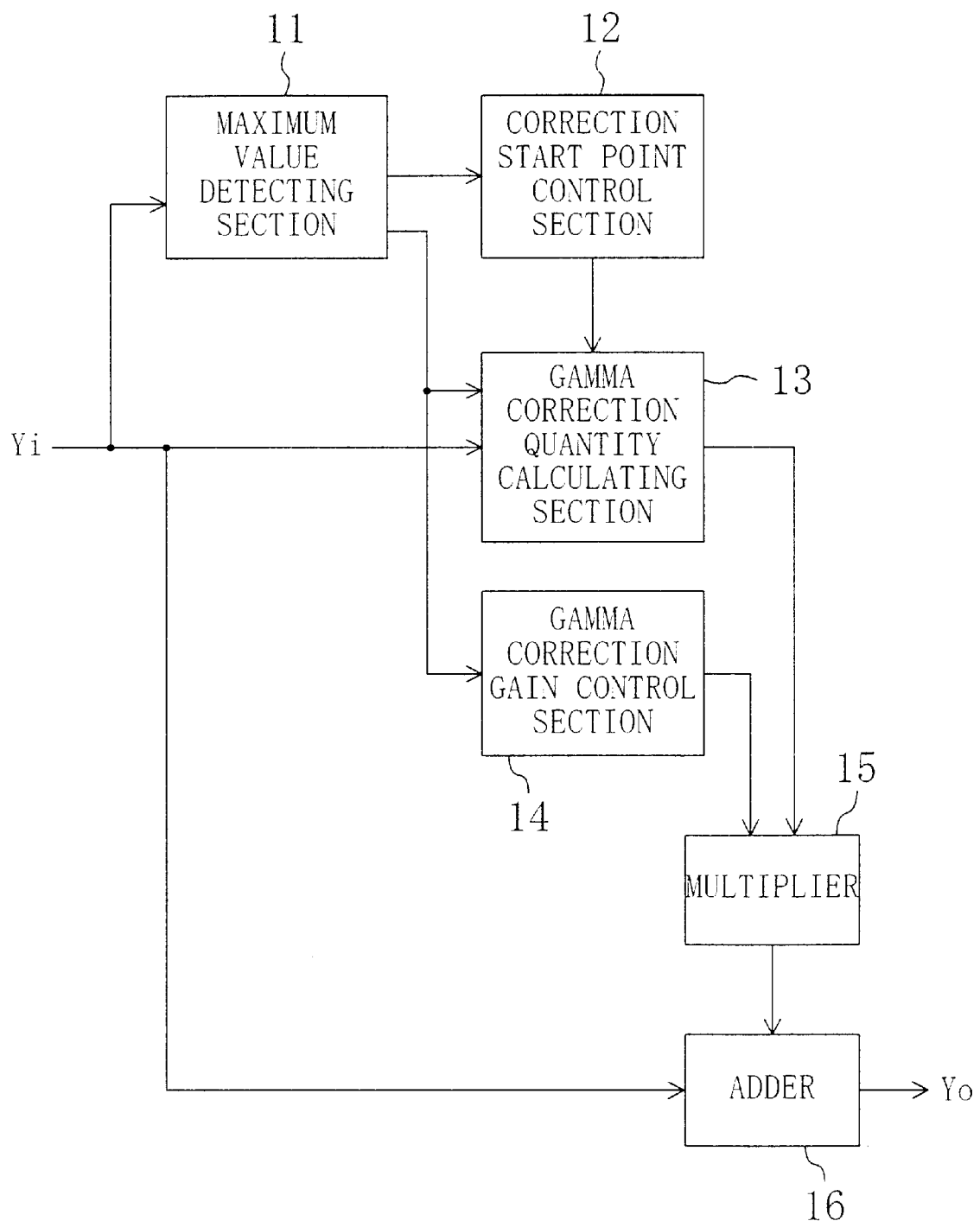
FIG. 1 is a block diagram of a dynamic gamma correction apparatus according to a first embodiment of the present invention.

FIG. 1 is a block diagram of a dynamic gamma correction apparatus according to a first embodiment of the present invention. The dynamic gamma correction apparatus shown in FIG. 1 includes maximum value detecting section 11, correction start point control section 12, gamma correction quantity calculating section 13, gamma correction gain control section 14, multiplier 15 and adder 16. A video luminance signal Yi is input to the maximum value detecting section 11, gamma correction quantity calculating section 13 and adder 16.

The maximum value detecting section 11 obtains the maximum value of the input luminance signal Yi in given 10 fields, for example, and then outputs it as a maximum luminance value mv to the correction start point control section 12, gamma correction quantity calculating section 13 and gamma correction gain control section 14. As the maximum luminance value mv, the maximum value of the luminance signal Yi in a predetermined number (e.g., 1 to 10) of fields or frames thereof may be obtained. The maximum value may be obtained from a predetermined number of fields just before the field on which the gamma correction should be performed, for example.

In accordance with the maximum luminance value mv, the correction start point control section 12 obtains a luminance s associated with the correction start point S and then outputs it to the gamma correction quantity calculating section 13. The correction start point S is the lower limit of the given range of the luminance signal Yi on which the correction is performed. Where the value of the luminance signal Yi is equal to or greater than the luminance s, the gamma correction is carried out. If the maximum luminance value mv is high, then the correction start point control section 12 selects a high correction start point S. Alternatively, if the maximum luminance value mv is low, then the correction start point control section 12 selects a low correction start point S. The luminance s at the correction start point S is given, for example, by $$s = k11 \times mv \quad (1)$$

where k11 is a positive constant and is ½, for example.

Figure 2:
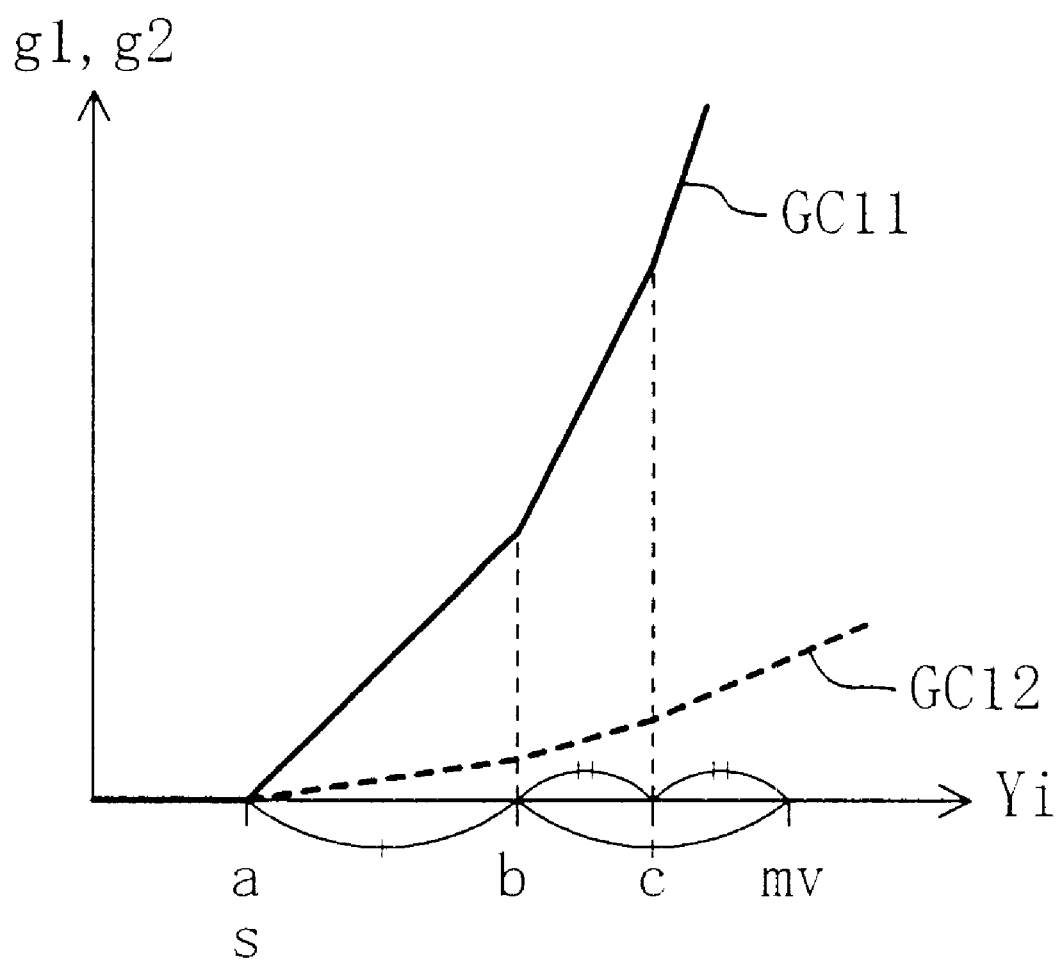
FIG. 2 is a graph illustrating an exemplary relationship between a luminance signal Yi and a provisional correction quantity g1 output from the gamma correction quantity calculating section shown in FIG. 1.

FIG. 2 is a graph illustrating an exemplary relationship between the luminance signal Yi and a provisional correction quantity g1 output from the gamma correction quantity calculating section 13 shown in FIG. 1. In FIG. 2, the abscissa represents the value of the luminance signal Yi, while the ordinate represents the correction quantity. As shown in FIG. 2, the curve GC11 is a curve in which four lines are connected together. In this case, slice levels a, b and c (where a<b<c) are defined as three abscissas, at which the curve GC11 is folded. Also, the distance between adjacent slice levels is defined in accordance with the maximum luminance value mv and the luminance s at the correction start point S so that the higher the luminance represented by a slice level, the smaller the distance between the slice level and the adjacent one.

Specifically, the gamma correction quantity calculating section 13 obtains the slice levels a, b and c, for example, by:

$$a=s \quad (2)$$

$$b=a+(mv-a)/2 \quad (3)$$

$$c=b+(mv-b)/2 \quad (4)$$

In this example, the slice level a is defined as the luminance s at the correction start point S; the midpoint between the slice level a and the maximum luminance value mv is defined as the slice level b; and the midpoint between the slice level b and the maximum luminance value mv is defined as the slice level c. In this manner, the slice levels can be obtained so that the distance between adjacent slice levels decreases as the luminance increases. Four or more slice levels can be sequentially obtained in this manner.

The gamma correction quantity calculating section 13 obtains g1=f(Yi), which is a provisional correction quantity with respect to the luminance signal Yi, using the slice levels a, b and c and according to a linear function having four intervals as given by the following Equations (5) through (8):

$$f(x)=0 \text{ (where } x \leq a\text{)} \quad (5)$$

$$f(x)=x-a \text{ (where } a<x \leq b\text{)} \quad (6)$$

$$f(x)=(x-a)+(x-b) \text{ (where } b<x \leq c\text{)} \quad (7)$$

$$f(x)=(x-a)+(x-b)+(x-c) \text{ (where } c<x\text{)} \quad (8)$$

and then outputs it to the multiplier 15. In these equations, the value of the luminance signal Yi is substituted for x. The provisional correction quantity g1 is the sum of the differences between the value Yi and the slice levels a, b and c that have values smaller than Yi.

FIG. 3 is a block diagram illustrating part of the dynamic gamma correction apparatus shown in FIG. 1, in which the gain for gamma correction is controlled. In FIG. 3, the maximum luminance value mv output from the maximum value detecting section 11 and a preset maximum luminance M are input to the gamma correction gain control section 14. The gamma correction gain control section 14 obtains a gamma correction gain gg in accordance with a value obtained by subtracting the maximum luminance value mv from the maximum luminance setting M, and then outputs it to the multiplier 15.

The gamma correction gain control section 14 obtains the gamma correction gain gg, for example, by $$gg=k12 \times (M-mv) \quad (9)$$

where k12 is a positive constant. In that case, if the maximum luminance value mv is lower than the maximum luminance setting M, then the gamma correction gain gg is a positive value. Alternatively, if the maximum luminance value mv is higher than the maximum luminance setting M, then the gamma correction gain gg is a negative value. An appropriate value should be defined as the maximum luminance setting M in view of the type of the appliance on which video should be displayed (e.g., CRT (cathode-ray tube), liquid crystal display, PDP (plasma display panel), etc.) or the characteristic thereof.

The multiplier 15 obtains a product of the provisional correction quantity g1 and the gamma correction gain gg and then outputs it as a gamma correction quantity g2, which is the final correction quantity, to the adder 16. The adder 16 obtains a sum of the luminance signal Yi and the gamma correction quantity g2 and then outputs it as a gray-scale-corrected luminance signal Yo.

The curve GC12 shown in FIG. 2 represents an exemplary relationship between the luminance signal Yi and the gamma correction quantity g2 output from the multiplier 15. The curve GC12 is obtained by multiplying the curve GC11 by the gamma correction gain gg.

FIG. 4 illustrates graphs showing exemplary input-output characteristics of the dynamic gamma correction apparatus shown in FIG. 1. In FIG. 4, the line L0 represents the input-output characteristic showing the relationship between the input luminance signal Yi and the output luminance signal Yo where no gamma correction is performed, while the curves L11 and L12 represent the input-output characteristic where the gamma correction is performed. Each of the curves L11 and L12 is obtained by adding a curve representing the gamma correction quantity g2 (e.g., the curve GC12 shown in FIG. 2) to the line L0.

Figure 4A:
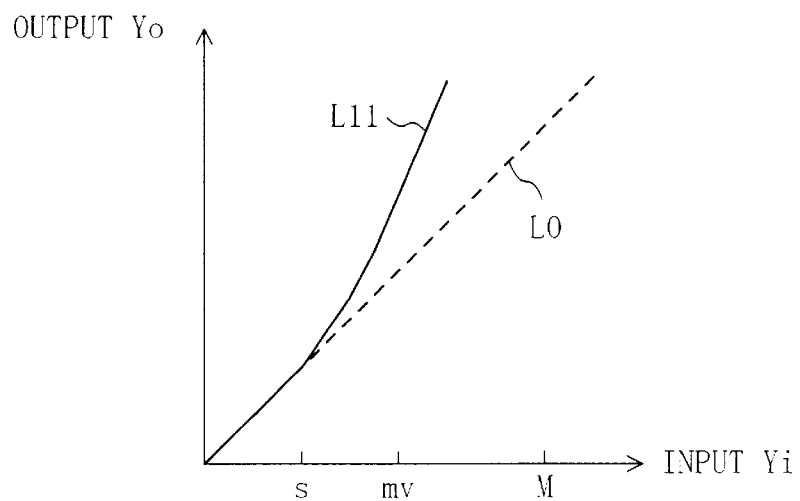
FIG. 4A is a graph illustrating exemplary input-output characteristics of the dynamic gamma correction apparatus shown in FIG. 1 where the maximum luminance value mv is relatively low.

Suppose the maximum luminance value mv is smaller than the maximum luminance setting M and the gamma correction gain gg is a positive value. FIG. 4A is a graph illustrating a situation where the maximum luminance value mv is relatively low. If the input luminance signal Yi has a luminance equal to or higher than the luminance s at the correction start point S, the correction is performed so that the output luminance signal Yo is greater than the luminance signal Yi by the difference between the curve L11 and the line L0.

As can be seen, where the maximum luminance value mv is relatively low, the correction start point control section 12 sets the correction start point S lower. Also, the gamma correction gain gg is relatively large. For that reason, the input-output characteristic of the dynamic gamma correction apparatus is defined such that part of the video that had a relatively low luminance originally also has its contrast enhanced. Video with a low maximum luminance value mv includes a lot of dark parts with low luminance. Accordingly, if the video has its gray scales corrected in accordance with such an input-output characteristic, desired video can be obtained.

Figure 4B:
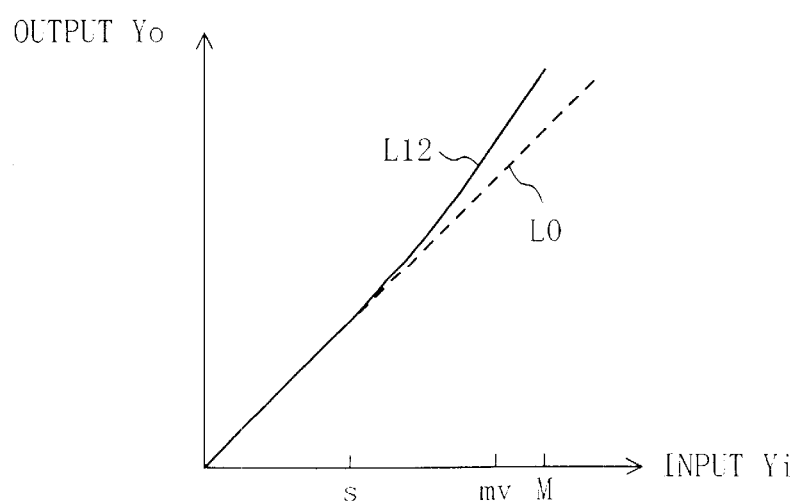
FIG. 4B is a graph illustrating exemplary input-output characteristics of the dynamic gamma correction apparatus shown in FIG. 1 where the maximum luminance value mv is equal to or smaller than the maximum luminance setting M and relatively high.

FIG. 4B is a graph illustrating a situation where the maximum luminance value mv is equal to or smaller than the maximum luminance setting M and relatively high. The curve L12 shown in FIG. 4B is illustrated as having a gamma correction gain gg, given by Equation (9), smaller than that of the curve L11 because the maximum luminance value mv of the luminance signal Yi is high.

As can be seen, where the maximum luminance value mv is relatively high, the correction start point control section 12 sets the correction start point S higher. For that reason, the input-output characteristic of the dynamic gamma correction apparatus becomes a characteristic in which gray scales closer to the reference white level are expanded, i.e., part of the video that already had a high luminance originally has its contrast enhanced. Video with a high maximum luminance value mv includes a lot of bright parts with high luminance. Accordingly, if the video has its gray scales corrected in accordance with such an input-output characteristic, desired video can be obtained.

Figure 5:
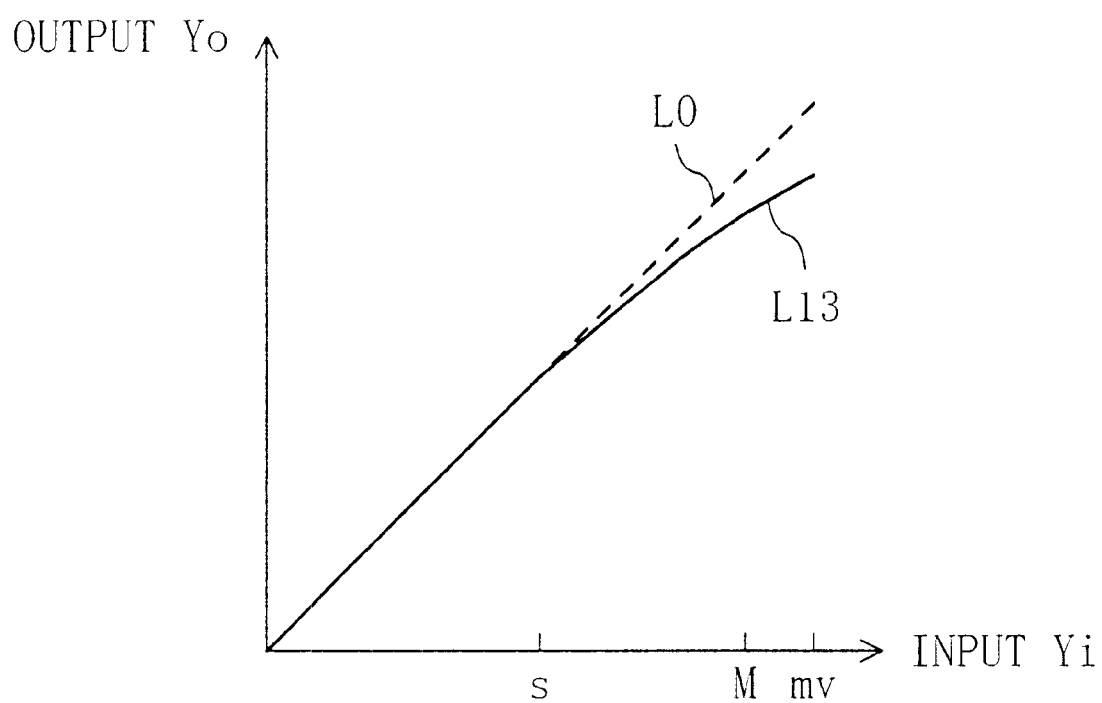
FIG. 5 is a graph illustrating exemplary input-output characteristics of the dynamic gamma correction apparatus shown in FIG. 1 where the maximum luminance value mv is greater than the maximum luminance setting M.

FIG. 5 is a graph illustrating exemplary input-output characteristics of the dynamic gamma correction apparatus shown in FIG. 1 where the maximum luminance value mv is greater than the maximum luminance setting M. In this case, the gamma correction gain gg has a negative value. Accordingly, if the value of the luminance signal Yi is greater than the luminance s at the correction start point S, then the gamma correction quantity g2 is negative, i.e., correction is performed so that the luminance signal Yi has its value decreased. The greater the value of the luminance signal Yi, the greater the absolute value of the gamma correction quantity g2. Also, the greater the maximum luminance value mv, the greater the absolute value of the gamma correction gain gg. Thus, the absolute value of the gamma correction quantity g2 also increases correspondingly.

As can be seen, where the maximum luminance value mv is greater than the maximum luminance setting M, the output luminance signal Yo will not have an excessively large value. Consequently, blooming can be prevented.

As described above, the dynamic gamma correction apparatus shown in FIG. 1 can control the correction start point S and the gamma correction gain gg in accordance with the maximum luminance value mv of the luminance signal Yi, and can perform gray scale correction adaptively on individual video.

(Modified Example of First Embodiment)

Figure 6:
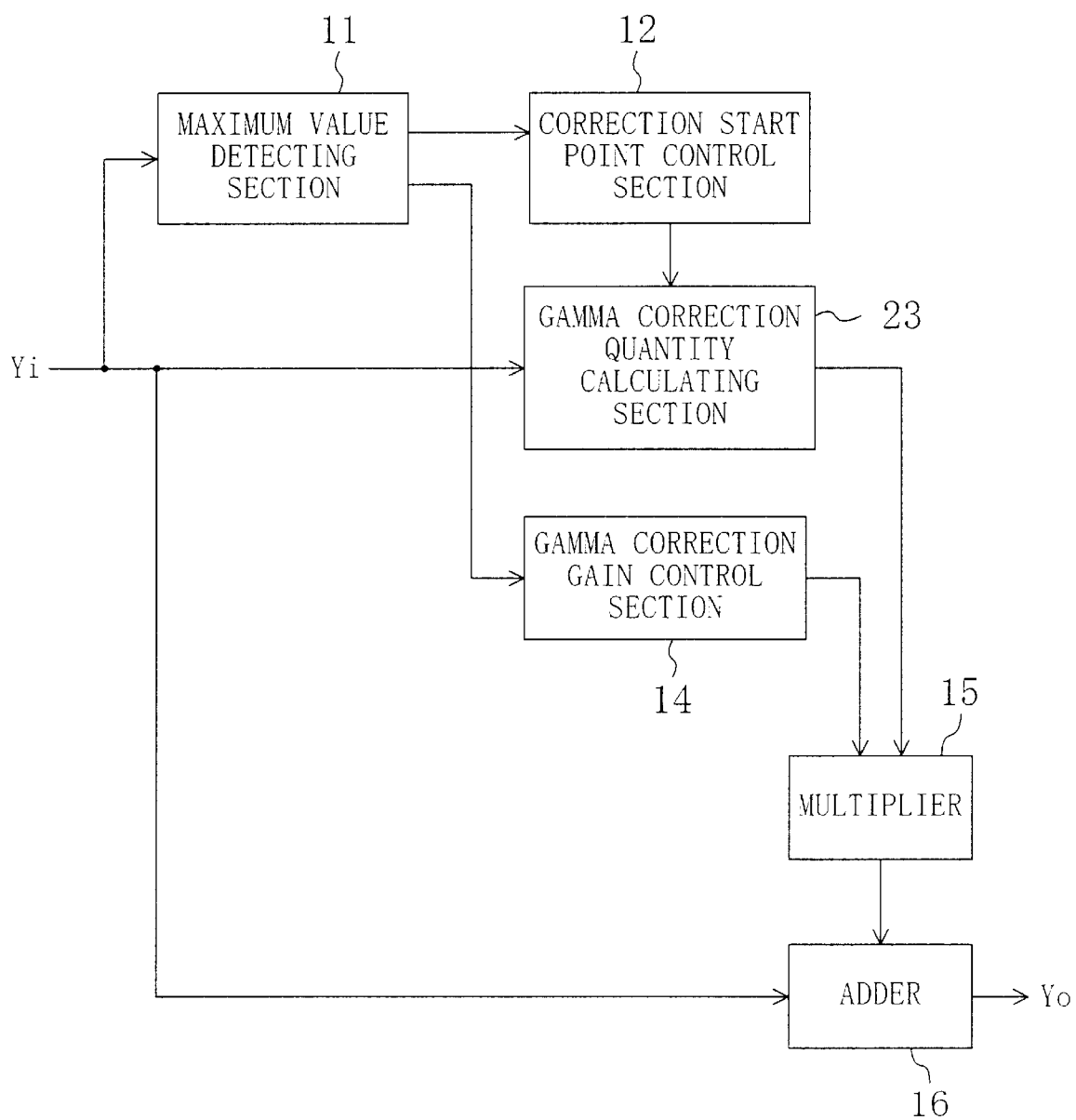
FIG. 6 is a block diagram of a dynamic gamma correction apparatus according to a modified example of the first embodiment.

FIG. 6 is a block diagram of a dynamic gamma correction apparatus according to a modified example of the first embodiment. The dynamic gamma correction apparatus shown in FIG. 6 includes an alternative gamma correction quantity calculating section 23 instead of the gamma correction quantity calculating section 13 included in the dynamic gamma correction apparatus shown in FIG. 1. Also, the maximum value detecting section 11 outputs the maximum luminance value mv to the correction start point control section 12 and the gamma correction gain control section 14. The other components are the same as the counterparts of the dynamic gamma correction apparatus shown in FIG. 1 and the description thereof will be omitted herein.

Figure 7:
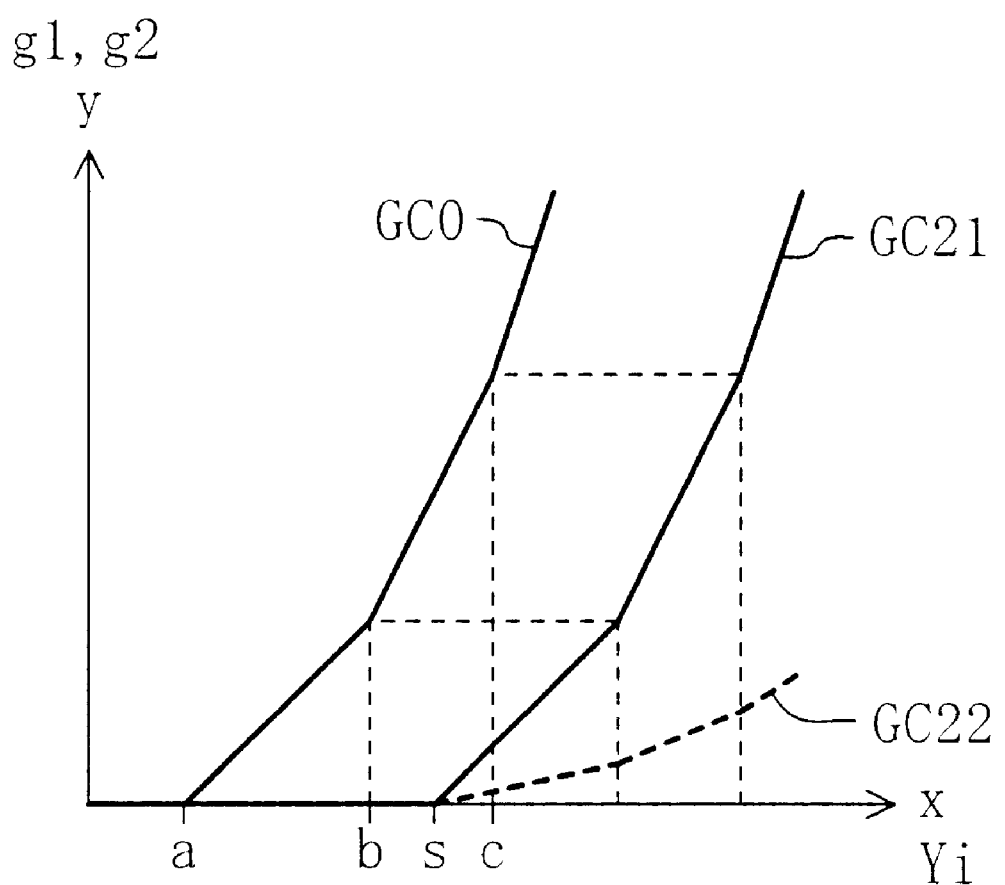
FIG. 7 is a graph illustrating exemplary relationships between the luminance signal Yi and the provisional correction quantity g1 output from the gamma correction quantity calculating section shown in FIG. 6.

FIG. 7 is a graph illustrating exemplary relationships between the luminance signal Yi and the provisional correction quantity g1 output from the gamma correction quantity calculating section 23 shown in FIG. 6. In FIG. 7, the x coordinate represents the value of the luminance signal Yi, while the y coordinate represents the provisional correction quantity g1. Slice levels a, b and c (where a<b<c) are defined as three x coordinates. The gamma correction quantity calculating section 23 stores the curve GC0 shown in FIG. 7 as a curve y=f(x). The function f(x) may be represented by Equations (5) through (8), for example. The function f(x) is the sum of the differences between the value x and the slice levels a, b and c that have values smaller than x. The curve GC0 is a curve in which four lines are connected together and is folded at the respective slice levels a through c.

The gamma correction calculating section 23 translates the curve GC0 shown in FIG. 7 along the x-axis, thereby producing a curve GC21 in which the slice level a shifts to the correction start point S. That is to say, the curve GC21 can be represented as a curve y=f(x−(s−a)) obtained by translating the curve GC0 in the positive direction along the x-axis by (s−a). In this case, the value of the luminance signal Yi is defined as the value x and the value y, obtained from the curve GC21, is defined as the provisional correction quantity g1. The gamma correction quantity calculating section 23 obtains the provisional correction quantity g1=f(Yi) with respect to the luminance signal Yi in accordance with the curve GC21 and then outputs it to the multiplier 15. In this case, the slice level a shifts to the luminance s and the slice levels b and c shift in the positive direction by (s−a).

As in the dynamic gamma correction apparatus shown in FIG. 1, the gamma correction gain control section 14 obtains the gamma correction gain gg and then outputs it to the multiplier 15. The multiplier 15 obtains a product of the provisional correction quantity g1 and the gamma correction gain gg and then outputs it as a gamma correction quantity g2, which is the final correction quantity, to the adder 16. The adder 16 obtains a sum of the luminance signal Yi and the gamma correction quantity g2 and then outputs it as a gray-scale-corrected luminance signal Yo.

The curve GC22 shown in FIG. 7 represents an exemplary relationship between the luminance signal Yi and the gamma correction quantity g2 output from the multiplier 15. The curve GC22 is obtained by multiplying the curve GC21 by the gamma correction gain gg.

As described above, the dynamic gamma correction apparatus shown in FIG. 6 can obtain the provisional correction quantity g1 without using the maximum luminance value mv and then obtain the gamma correction quantity g2 from the quantity g1.

(Second Embodiment)

Figure 8:
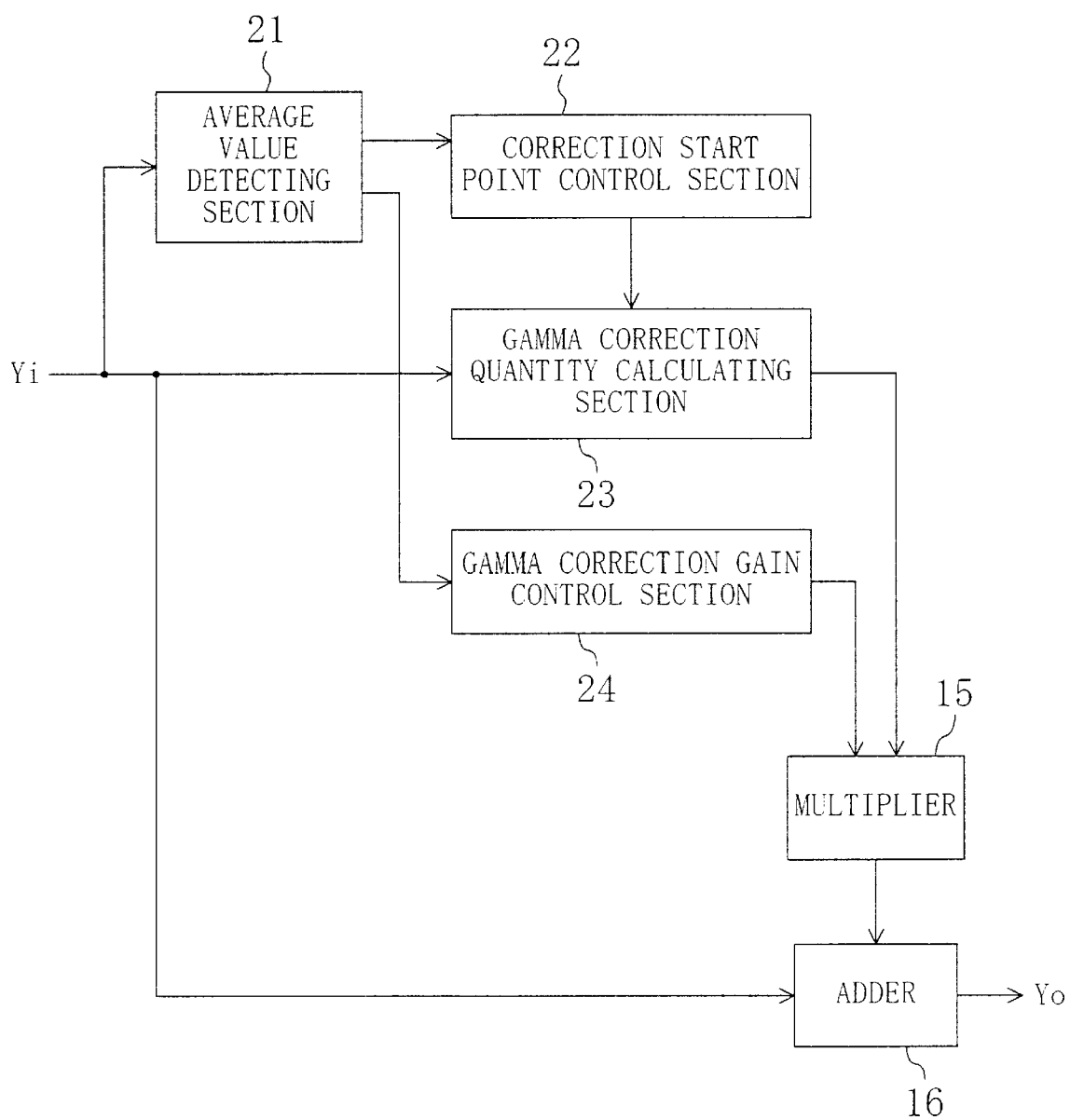
FIG. 8 is a block diagram of a dynamic gamma correction apparatus according to a second embodiment of the present invention.

FIG. 8 is a block diagram of a dynamic gamma correction apparatus according to a second embodiment of the present invention. The dynamic gamma correction apparatus shown in FIG. 8 includes average value detecting section 21, correction start point control section 22, gamma correction quantity calculating section 23, gamma correction gain control section 24, multiplier 15 and adder 16. A video luminance signal Yi is input to the average value detecting section 21, gamma correction quantity calculating section 23 and adder 16.

The average value detecting section 21 obtains the average value av of the input luminance signal Yi in given 10 fields, for example, and then outputs it to the correction start point control section 12 and gamma correction gain control section 24. As the average value av, the average value of the luminance signal Yi in a predetermined number (e.g., 1 to 10) of fields or frames thereof may be obtained. The average value may be obtained from a predetermined number of fields just before the field on which the gamma correction should be performed, for example.

In accordance with the average value av of the luminance signal Yi, the correction start point control section 22 obtains a luminance s associated with the correction start point S and then outputs it to the gamma correction quantity calculating section 23. If the average value av is high, then the correction start point control section 22 selects a high correction start point S. Alternatively, if the average value av is low, then the correction start point control section 22 selects a low correction start point S. The luminance s at the correction start point S is given, for example, by $$s = k21 \times av \tag{10}$$

where k21 is a positive constant and is ½, for example.

The gamma correction quantity calculating section 23 obtains a provisional correction quantity g1 for the individual luminance signal Yi with the correction start point S taken into account, and then outputs it to the multiplier 15. The gamma correction gain control section 24 obtains a gamma correction gain gg as a gain for the provisional correction quantity g1 in accordance with the average value av, and then outputs it to the multiplier 15. The multiplier 15 obtains a product of the provisional correction quantity g1 and the gamma correction gain gg and then outputs it as a gamma correction quantity g2, which is the final correction quantity, to the adder 16. The adder 16 obtains a sum of the luminance signal Yi and the gamma correction quantity g2 and then outputs it as a gray-scale-corrected luminance signal Yo.

The gamma correction quantity calculating section 23 is the same as that described for the modified example of the first embodiment and the detailed description thereof will be omitted herein.

FIG. 9 is a block diagram illustrating part of the dynamic gamma correction apparatus shown in FIG. 8, in which the gain for gamma correction is controlled. In FIG. 9, the average value av of the luminance signal Yi output from the average value detecting section 21 and a preset threshold value A are input to the gamma correction gain control section 24. The gamma correction gain control section 24 obtains a gamma correction gain gg in accordance with a value obtained by subtracting the threshold value A from the average value av, and then outputs it to the multiplier 15.

The gamma correction gain control section 24 obtains the gamma correction gain gg, for example, by $$gg = k22 \times (av - A) \quad (11)$$

where k22 is a positive constant. In that case, if the average value av is higher than the threshold value A, then the gamma correction gain gg is a positive value. Alternatively, if the average value av is lower than the threshold value A, then the gamma correction gain gg is a negative value. The multiplier 15 outputs the product of the provisional correction quantity g1, output from the gamma correction quantity calculating section 23, and the gamma correction gain gg to the adder 16. Accordingly, the gamma correction quantity g2, which is added by the adder 16 to the luminance signal Yi, is a positive value if the gamma correction gain is positive but is a negative value if the gamma correction gain is negative.

The relationship between the luminance signal Yi and the gamma correction quantity g2 output from the multiplier 15 may be represented by the curve GC22 shown in FIG. 7, for example. The curve GC22 is obtained by multiplying the curve GC21, representing the provisional correction quantity g1, by the gamma correction gain gg.

FIG. 10 illustrates graphs showing exemplary input-output characteristics of the dynamic gamma correction apparatus shown in FIG. 8. In FIG. 10, the line L0 represents the input-output characteristic showing the relationship between the input luminance signal Yi and the output luminance signal Yo where no gamma correction is performed, while the curves L21 and L22 represent the input-output characteristic where the gamma correction is performed. Each of the curves L21 and L22 is obtained by adding a curve representing the gamma correction quantity g2 (e.g., the curve GC22 shown in FIG. 7) to the line L0. The curves L21 and L22 both represent the input-output characteristics where the average value av of the luminance signal Yi is higher than the threshold value A and the gamma correction gain gg is a positive value.

Figure 10A:
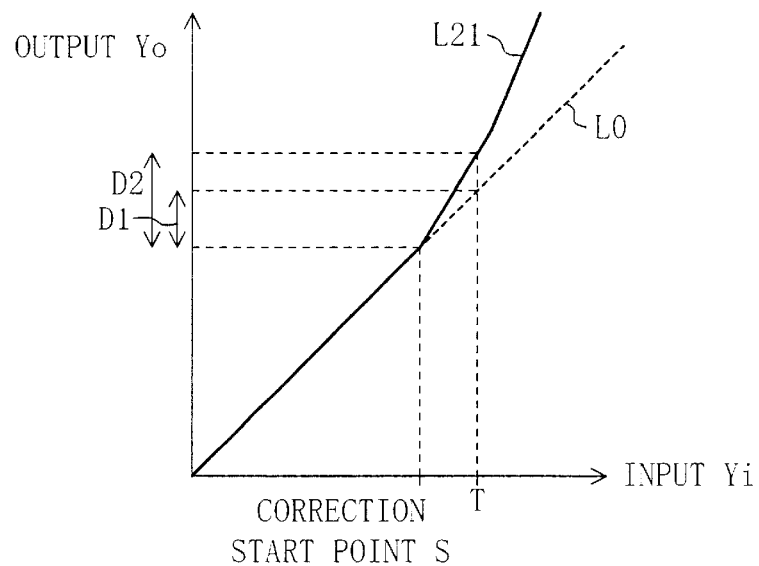
FIG. 10A is a graph illustrating an input-output characteristic L21 of the dynamic gamma correction apparatus shown in FIG. 8 where an average value av of the luminance signal Yi is relatively high.

FIG. 10A is a graph illustrating the input-output characteristic L21 of the dynamic gamma correction apparatus shown in FIG. 8 where the average value av of the luminance signal Yi is relatively high. An output luminance signal Yo associated with an input luminance signal Yi with the luminance s at the correction start point S has a luminance different from that of an output luminance signal Yo associated with an input luminance signal Yi with a higher luminance at the point T. The difference is D1 where no gamma correction is performed. However, where the gamma correction is performed, the difference increases to D2. As can be seen, where the input luminance signal Yi has a luminance equal to or greater than the luminance s at the correction start point S, correction is performed so that the output luminance signal Yo is greater than the luminance signal Yi by the difference between the curve L21 and the line L0.

If the average value av is relatively high, the correction start point control section 22 sets the correction start point S higher. For that reason, the input-output characteristic becomes a characteristic in which gray scales closer to the reference white level are increased, i.e., part of the video that already had a high luminance originally has its contrast enhanced. Video in which the luminance signal Yi has a high average value av includes a lot of bright parts with high luminance. Accordingly, if the video has its gray scales corrected in accordance with the input-output characteristic as represented by the curve L21 shown in FIG. 10A, desired video can be obtained.

Figure 10B:
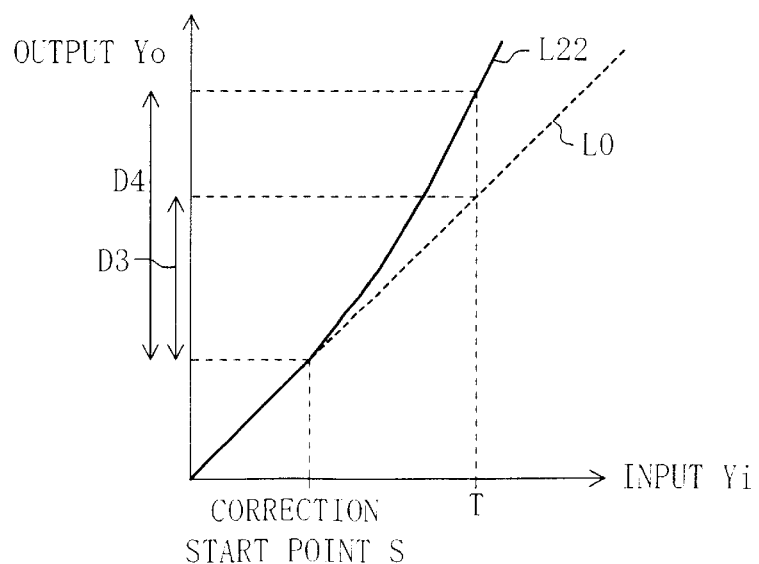
FIG. 10B is a graph illustrating an input-output characteristic L22 of the dynamic gamma correction apparatus shown in FIG. 8 where an average value av of the luminance signal Yi is equal to or greater than a threshold value A and relatively low.

FIG. 10B is a graph illustrating the input-output characteristic L22 of the dynamic gamma correction apparatus shown in FIG. 8 where the average value av of the luminance signal Yi is equal to or greater than the threshold value A and relatively low. Since the average value av of the luminance signal Yi is low, the curve L22 is illustrated in FIG. 10B as being associated with a gamma correction gain gg (given by Equation (11)) smaller than that of the curve L21. An output luminance signal Yo associated with an input luminance signal Yi with the luminance s at the correction start point S has a luminance different from that of an output luminance signal Yo associated with an input luminance signal Yi with a higher luminance at the point T. The difference is D3 where no gamma correction is performed. However, where the gamma correction is performed, the difference increases to D4.

If the average value av is relatively low, the correction start point control section 22 sets the correction start point S lower. For that reason, the characteristic is defined such that part of the video that had a relatively low luminance originally also has its contrast enhanced. Video in which the luminance signal Yi has a low average value av includes a lot of dark parts with low luminance. Accordingly, if the video has its gray scales corrected in accordance with the input-output characteristic as represented by the curve L22 shown in FIG. 10B, desired video can be obtained.

If the average value av of the luminance signal Yi is smaller than the threshold value A, then the gamma correction gain gg is negative. Accordingly, the difference in luminance between the output luminance signal Yo associated with the input luminance signal Yi with the luminance s at the correction start point S and the output luminance signal Yo associated with the input luminance signal Yi with a higher luminance at the point T decreases when gamma correction is performed.

As described above, the dynamic gamma correction apparatus shown in FIG. 8 can control the correction start point S and the gamma correction gain gg in accordance with the average value av of the luminance signal Yi, and can perform gray scale correction adaptively on individual video. In particular, where the luminance signal Yi has a small average value av, the video on the screen is dark as a whole and blooming likely occurs normally. However, since the gamma correction gain gg is set lower in that situation, the occurrence of the blooming can be suppressed.

It should be noted that the apparatus may include the maximum value detecting section 11 as an additional component and the gamma correction quantity calculating section 13 instead of the gamma correction quantity calculating section 23. In such an embodiment, the provisional correction quantity g1 and gamma correction quantity g2 can be obtained with the maximum luminance value mv taken into account.

(Third Embodiment)

Figure 11:
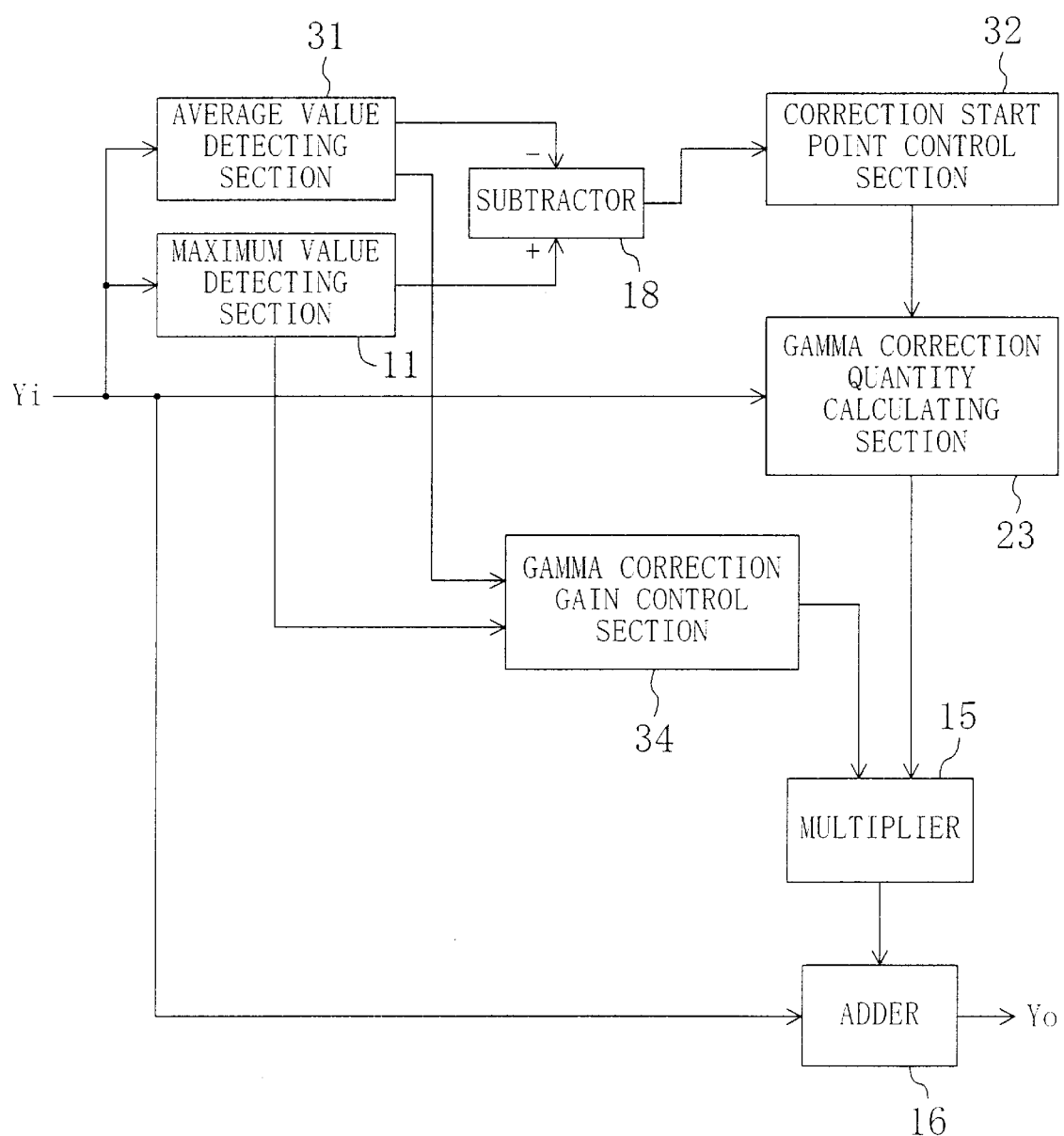
FIG. 11 is a block diagram of a dynamic gamma correction apparatus according to a third embodiment of the present invention.

FIG. 11 is a block diagram of a dynamic gamma correction apparatus according to a third embodiment of the present invention. The dynamic gamma correction apparatus shown in FIG. 11 further includes the maximum value detecting section 11 and a subtractor 18 in addition to all the components of the dynamic gamma correction apparatus shown in FIG. 8. Also, the apparatus shown in FIG. 11 includes average value detecting section 31, correction start point control section 32 and gamma correction gain control section 34 instead of the average value detecting section 21, correction start point control section 22 and gamma correction gain control section 14, respectively. The average value av and maximum luminance value mv are input to the gamma correction gain control section 34. The luminance signal Yi is input to the average value detecting section 31, maximum value detecting section 11, gamma correction quantity calculating section 23 and adder 16.

The average value detecting section 31 obtains the average value av of the input luminance signal Yi in given 10 fields, for example, and then outputs it to the subtractor 18 and gamma correction gain control section 34. The average value detecting section 31 represents the average value av as a signal level and then outputs it to the gamma correction gain control section 34.

The maximum value detecting section 11 obtains the maximum value of the input luminance signal Yi in given 10 fields, for example, and then outputs it as a maximum luminance value mv to the subtractor 18 and gamma correction gain control section 34. As the average and maximum values av and mv, the average and maximum values of the luminance signal Yi in a predetermined number (e.g., 1 to 10) of fields or frames thereof may be obtained. The average and maximum values may be obtained from a predetermined number of fields just before the field on which the gamma correction should be performed, for example.

The subtractor 18 subtracts the average value av, output from the average value detecting section 31, from the maximum luminance value mv output from the maximum value detecting section 11, and then outputs the difference obtained df=mv−av to the correction start point control section 32.

In accordance with the difference df, the correction start point control section 32 obtains a luminance s at the correction start point S and then outputs it to the gamma correction quantity calculating section 23. If the difference df between the maximum luminance value mv and the average value av is small, then the correction start point control section 32 selects a high correction start point S. Alternatively, if the difference df between the maximum luminance value mv and the average value av is large, then the correction start point control section 32 selects a low correction start point S. The luminance s at the correction start point S is given, for example, by s=c1−k31×df (where c1 and k31 are positive constants).

Figure 12:
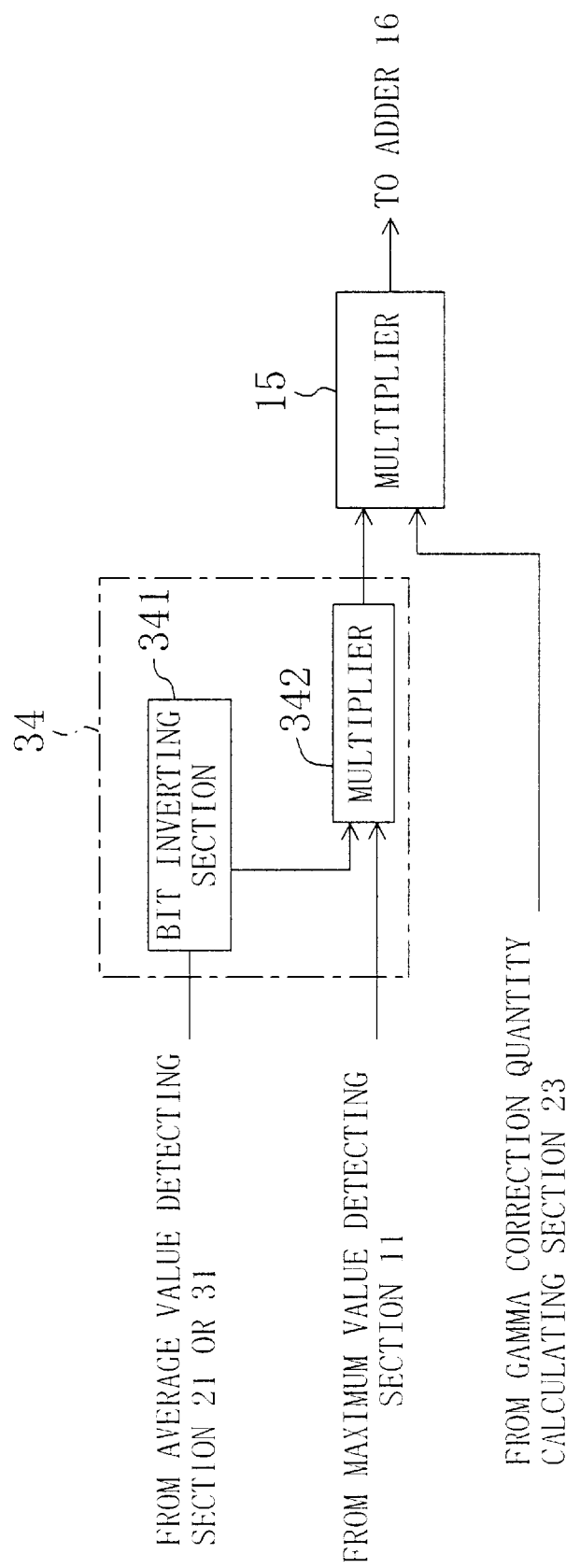
FIG. 12 is a block diagram illustrating part of the dy10 namic gamma correction apparatus shown in FIG. 11, in which the gain for gamma correction is controlled.

FIG. 12 is a block diagram illustrating part of the dynamic gamma correction apparatus shown in FIG. 11, in which the gain for gamma correction is controlled. In FIG. 12, the gamma correction gain control section 34 includes a bit inverting section 341 and a multiplier 342. The average value av, represented as a signal level, is input to the bit inverting section 341.

The bit inverting section 341 herein operates as an inverter, i.e., inverts the input signal and then outputs the inverted version to the multiplier 342. Specifically, if the average value av is higher than the threshold value of the bit inverting section 341, then the bit inverting section 341 outputs a low potential level (which will be herein denoted by "L"). Alternatively, if the average value av is lower than the threshold value, then the bit inverting section 341 outputs a high potential level (which will be herein denoted by "H"). The multiplier 342 converts the signal levels "L" and "H" into "0" and "1", respectively, obtains a product of "0" or "1" and the maximum luminance value mv output from the maximum value detecting section 11 as a gamma correction gain gg and then outputs it to the multiplier 15. Accordingly, if the average value av is higher than the threshold value of the bit inverting section 341, the multiplier 342 outputs zero as the gamma correction gain gg to the multiplier 15. Alternatively, if the average value av is lower than the threshold value, the multiplier 342 outputs gg=k32× mv (where k32 is a positive constant) as the gamma correction gain gg to the multiplier 15.

Accordingly, the dynamic gamma correction apparatus shown in FIG. 11 performs no correction if the average value av of the luminance signal Yi is high, but obtains the gamma correction gain gg from the maximum luminance value mv and does perform correction if the average value av is low.

The gamma correction quantity calculating section 23 is the same as the counterpart already described with reference to FIG. 6 and the multiplier 15 and adder 16 are the same as the counterparts already described with reference to FIG. 8. And the description thereof will be omitted herein.

If the difference between the maximum luminance and average values mv and av is small, the correction start point control section 32 sets the correction start point S higher. For that reason, the input-output characteristic of the dynamic gamma correction apparatus becomes a characteristic in which part of the video that already had a high luminance originally has its contrast enhanced. Video in which the difference between the maximum luminance and average values mv and av is small includes a lot of bright parts with high luminance. Accordingly, if the video has its gray scales corrected in accordance with such an input-output characteristic, desired video can be obtained.

If the difference between the maximum luminance and average values mv and av is large, the correction start point control section 32 sets the correction start point S lower. For that reason, the input-output characteristic of the dynamic gamma correction apparatus is defined such that part of the video that had a relatively low luminance originally also has its contrast enhanced. Video in which the difference between the maximum luminance and average values mv and av is large includes a lot of dark parts with low luminance. Accordingly, if the video has its gray scales corrected in accordance with such an input-output characteristic, desired video can be obtained.

Also, where the average value av of the luminance signal Yi is high, the entire screen is already bright and the correction could not be so effective and the gamma correction quantity g2 may be decreased. On the other hand, where the average value av is low, the correction can be effective and the gamma correction quantity g2 may be increased.

As described above, the dynamic gamma correction apparatus shown in FIG. 11 can control the correction start point S and the gamma correction gain gg in accordance with the average and maximum luminance values av and mv of the luminance signal Yi, and can perform gray scale correction adaptively on individual video.

It should be noted that the average value detecting section 31 may be replaced with the average value detecting section 21 that outputs the average value av as a numerical value. In that case, the bit inverting section inverts the respective bits included in an input value, which is represented as a binary number, and then outputs them to the multiplier 342. That is to say, the output value iav of this bit inverting section is small if the average value av is high but large if the average value av is low. The multiplier 342 outputs a product of the output value iav of the bit inverting section and the maximum luminance value mv, i.e., $gg=k33 \times iav \times mv$ (where k33 is a positive constant), as the gamma correction gain gg to the multiplier 15.

Also, in FIG. 11, the average value detecting section 31 may be replaced with the average value detecting section 21 and the gamma correction gain control section 34 may be an arithmetic unit for obtaining the gamma correction gain gg using the average and maximum luminance values av and mv (e.g., by $gg=k34 \times (c2-av) \times mv$, where c2 and k34 are positive constants). In this case, c2 is the maximum value that the luminance signal Yi can assume, for example.

Even in such an embodiment, the gamma correction gain gg can also be obtained using the average and maximum luminance values av and mv so as to have a small value if the average value av is high or a large value if the average value av is low.

Furthermore, the apparatus may include the gamma correction quantity calculating section 13 instead of the gamma correction quantity calculating section 23 so that the section 13 uses the output of the maximum value detecting section 11. In that case, the provisional correction quantity g1 and the gamma correction quantity g2 can be obtained with the maximum luminance value mv into account.

(Fourth Embodiment)

Figure 13:
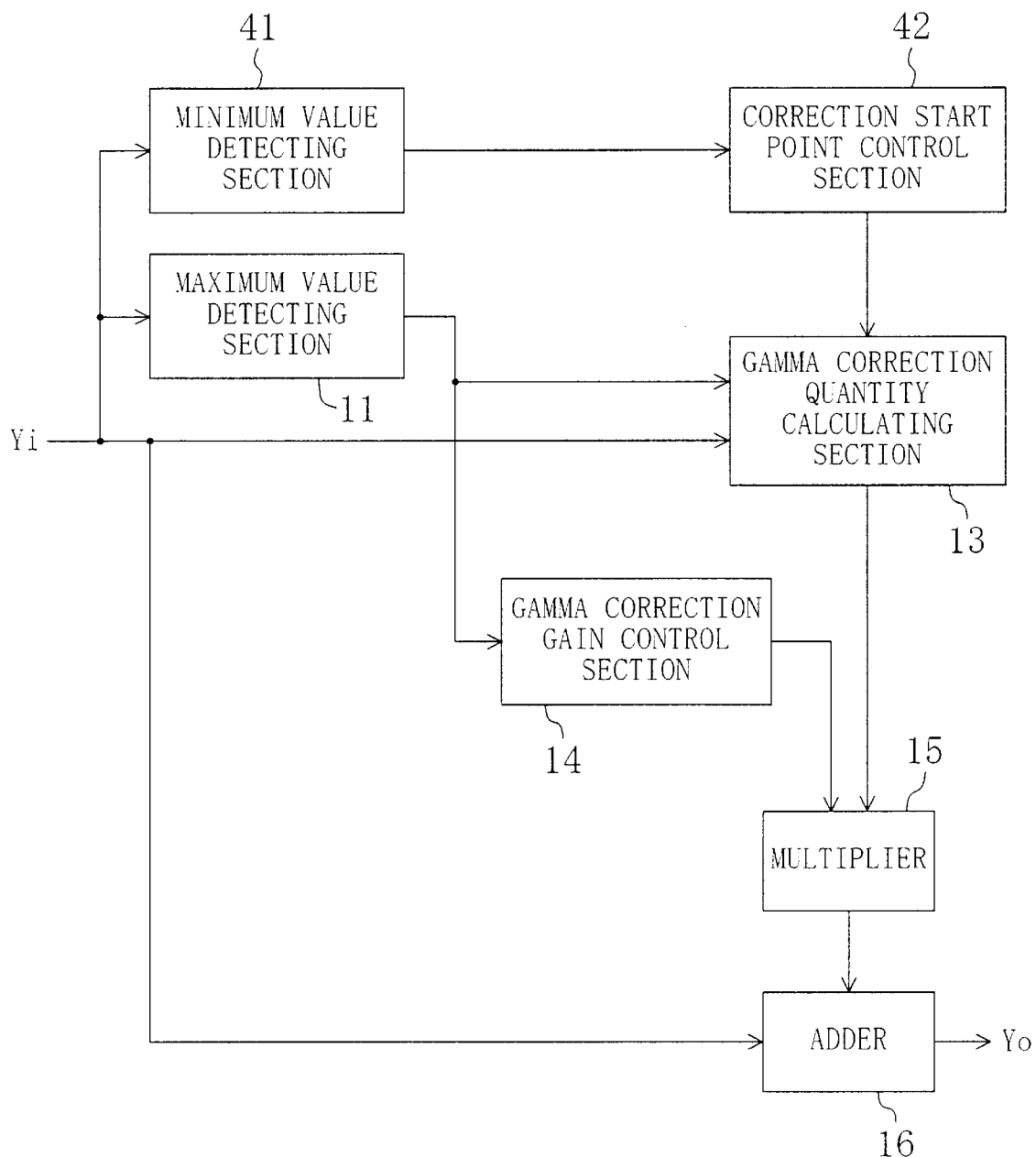
FIG. 13 is a block diagram of a dynamic gamma correction apparatus according to a fourth embodiment of the present invention.

FIG. 13 is a block diagram of a dynamic gamma correction apparatus according to a fourth embodiment of the present invention. The dynamic gamma correction apparatus shown in FIG. 13 further includes a minimum value detecting section 41 in addition to all the components of the dynamic gamma correction apparatus shown in FIG. 1. Also, the apparatus includes the correction start point control section 42 instead of the correction start point control section 12. The output of the minimum value detecting section 41, not that of the maximum value detecting section 11, is input to the correction start point control section 42 shown in FIG. 13. The luminance signal Yi is input to the maximum value detecting section 11, minimum value detecting section 41, gamma correction quantity calculating section 13 and adder 16.

The maximum value detecting section 11 obtains the maximum value of the input luminance signal Yi in given 10 fields, for example, and then outputs it as a maximum luminance value mv to the gamma correction quantity calculating section 13 and gamma correction gain control section 14. In the same way, the minimum value detecting section 41 obtains the minimum value of the input luminance signal Yi in given 10 fields, for example, and then outputs it as a minimum luminance value nv to the correction start point control section 42. As the maximum and minimum luminance values mv and nv, the maximum and minimum values of the luminance signal Yi in a predetermined number (e.g., 1 to 10) of fields or frames thereof may be obtained. The maximum and minimum luminance values may be obtained from a predetermined number of fields just before the field on which the gamma correction should be performed, for example.

In accordance with the minimum luminance value nv, the correction start point control section 42 obtains a luminance s at the correction start point S and then outputs it to the gamma correction quantity calculating section 23. If the minimum luminance value nv is high, then the correction start point control section 42 selects a high correction start point S. Alternatively, if the minimum luminance value nv is low, then the correction start point control section 42 selects a low correction start point S. The luminance s at the correction start point S is given, for example, by $s=k41 \times nv$ (where k41 is a positive constants). Particularly when k41=1, almost all of the luminance signal Yi can be subjected to the gamma correction.

The gamma correction quantity calculating section 13, gamma correction gain control section 14, multiplier 15 and adder 16 are the same as the counterparts already described with reference to FIG. 1, and the description thereof will be omitted herein.

If the minimum luminance value nv is relatively high, the correction start point control section 42 sets the correction start point S higher. For that reason, the input-output characteristic of the dynamic gamma correction apparatus becomes a characteristic in which part of the video that already had a high luminance originally has its contrast enhanced. On the other hand, if the minimum luminance value nv is relatively low, the correction start point control section 42 sets the correction start point S lower. For that reason, the input-output characteristic of the dynamic gamma correction apparatus becomes a characteristic in which part of the video that had a low luminance originally has its contrast enhanced.

As described above, the dynamic gamma correction apparatus shown in FIG. 13 can control the correction start point S in accordance with the minimum luminance value nv of the luminance signal. Also, the apparatus obtains the gamma correction quantity g2 in accordance with the luminance s at the correction start point S and the maximum luminance value mv. Thus, the apparatus can perform gray scale correction adaptively on individual video.

In the foregoing first through fourth embodiments, several exemplary combinations of correction start point control, gamma correction gain control and gamma correction quantity calculating sections have been described. However, the correction start point control, gamma correction gain control and gamma correction quantity calculating sections of the foregoing embodiments may be used in any arbitrary combination.

Also, in the foregoing embodiments, each of the curves GC0, GC11, GC12, GC21 and GC22, representing the relationship between the provisional correction quantity g1 or gamma correction quantity g2 and the luminance signal Yi, is a connection of four lines. Alternatively, each of these curves may also be a connection of five or more lines or three or less lines. That is to say, the linear function for use in obtaining the provisional correction quantity g1 with respect to the luminance signal Yi does not have to include four intervals but may have any other arbitrary number of intervals.

As described above, the present invention controls the gamma correction range and quantity in accordance with the average, maximum and minimum value(s) of a luminance signal, for example. Thus, the present invention realizes a gamma correction apparatus that can perform gray scale correction effectively and adaptively on an individual video basis. In addition, gray scale correction can also be performed appropriately in accordance with the characteristic of an appliance on which video should be displayed.

What is claimed is:

1. A dynamic gamma correction apparatus for performing a correction on a video luminance signal, the apparatus comprising:

a correction start point control section for obtaining a correction start point, which is a lower limit of a given correction range, in accordance with a characteristic value of the luminance signal;

a gamma correction quantity calculating section for obtaining a provisional correction quantity for the luminance signal to be corrected using the correction start point and the luminance signal;

a gamma correction gain control section for obtaining a gain for the provisional correction quantity in accordance with the characteristic value of the luminance signal;

a multiplier for obtaining a product of the provisional correction quantity and the gain as a gamma correction quantity; and an adder for obtaining a sum of the luminance signal and the gamma correction quantity and outputting the sum.

2. The dynamic gamma correction apparatus of claim 1, further comprising a maximum value detecting section for obtaining a maximum value of the luminance signal, wherein the correction start point control section obtains the correction start point in accordance with the maximum value.

3. The dynamic gamma correction apparatus of claim 1, further comprising an average value detecting section for obtaining an average value of the luminance signal, wherein the correction start point control section obtains the correction start point in accordance with the average value.

4. The dynamic gamma correction apparatus of claim 1, further comprising:

a maximum value detecting section for obtaining a maximum value of the luminance signal; and an average value detecting section for obtaining an average value of the luminance signal, wherein the correction start point control section obtains the correction start point in accordance with a difference obtained by subtracting the average value from the maximum value.

5. The dynamic gamma correction apparatus of claim 1, further comprising a minimum value detecting section for obtaining a minimum value of the luminance signal, wherein the correction start point control section obtains the correction start point in accordance with the minimum value.

6. The dynamic gamma correction apparatus of claim 1, further comprising a maximum value detecting section for obtaining a maximum value of the luminance signal, wherein the gamma correction gain control section obtains the gain in accordance with a value obtained by subtracting the maximum value from a preset maximum luminance.

7. The dynamic gamma correction apparatus of claim 1, further comprising an average value detecting section for obtaining an average value of the luminance signal, wherein the gamma correction gain control section obtains the gain in accordance with a value obtained by subtracting a preset threshold value from the average value.

8. The dynamic gamma correction apparatus of claim 1, further comprising:

a maximum value detecting section for obtaining a maximum value of the luminance signal; and an average value detecting section for obtaining an average value of the luminance signal, wherein the gamma correction gain control section obtains the gain in accordance with the average and maximum values so that the higher the average value, the smaller the gain and that the lower the average value, the larger the gain.

9. The dynamic gamma correction apparatus of claim 1, wherein the gamma correction quantity calculating section obtains the provisional correction quantity by a linear function using the luminance signal to be corrected as a variable, and wherein the linear function has a predetermined number of intervals where the greater a variable associated with one of the intervals, the greater a coefficient of the linear function associated with the interval.

10. The dynamic gamma correction apparatus of claim 9, further comprising a maximum value detecting section for obtaining a maximum value of the luminance signal, wherein the gamma correction quantity calculating section determines the respective intervals of the linear function by the correction start point and the maximum value.

* * * * *